(12) United States Patent
Vanhakartano et al.

(10) Patent No.: US 12,066,579 B2
(45) Date of Patent: Aug. 20, 2024

(54) REAL-TIME MONITORING OF SURROUNDINGS OF MARINE VESSEL

(71) Applicant: ABB Schweiz AG, Baden (CH)

(72) Inventors: Santeri Vanhakartano, Helsinki (FI); Kalevi Tervo, Helsinki (FI); Eero Lehtovaara, Helsinki (FI); Antti Pehkonen, Tampere (FI); Jari Saarinen, Espoo (FI)

(73) Assignee: ABB Schweiz AG, Baden (CH)

( * ) Notice: Subject to any disclaimer, the term of this patent is extended or adjusted under 35 U.S.C. 154(b) by 136 days.

(21) Appl. No.: 16/876,247

(22) Filed: May 18, 2020

(65) Prior Publication Data

US 2020/0278433 A1    Sep. 3, 2020

Related U.S. Application Data

(63) Continuation of application No. PCT/EP2017/079573, filed on Nov. 17, 2017.

(51) Int. Cl.
*G01S 7/62* (2006.01)
*G01S 7/06* (2006.01)
(Continued)

(52) U.S. Cl.
CPC ......... *G01S 7/6281* (2013.01); *G01S 7/062* (2013.01); *G01S 7/51* (2013.01); *G01S 7/6263* (2013.01); *G01S 13/917* (2019.05); *G01S 13/937* (2020.01); *G01S 15/93* (2013.01); *G01S 17/93* (2013.01); *G06F 3/04815* (2013.01)

(58) Field of Classification Search
CPC .......... G01S 7/6281; G01S 7/062; G01S 7/51; G01S 7/6263; G01S 13/917; G01S 13/937; G01S 15/93; G01S 17/93; G01S 13/86; G01S 15/87; G01S 7/24; G01S 7/629; G06F 3/04815
See application file for complete search history.

(56) References Cited

U.S. PATENT DOCUMENTS 9,139,133 B2 * 9/2015 Eng .................. G08G 1/165
9,718,530 B2    8/2017 Kabel et al.
(Continued)

FOREIGN PATENT DOCUMENTS

KR    20150000903 A    1/2015
WO     2017136014 A2   8/2017

OTHER PUBLICATIONS

"FleetMon: Tracking the Seven Seas", published at https://www.fleetmon.com/vessels/ and pubished and archived at archive.org as of at least May 29, 2016 (Year: 2016).*

(Continued)

*Primary Examiner* — William A Beutel
(74) *Attorney, Agent, or Firm* — Leydig, Voit & Mayer, Ltd.

(57) ABSTRACT

Real-time monitoring of surroundings of a marine vessel. One or more observation sensor modules are configured and positioned to generate sensor data extending around the marine vessel. One or more data processors are configured to map and visualize the sensor data in relation to a virtual model of the marine vessel. A user interface is configured to display the virtual model together with the visualized sensor data from a user selectable point of view to a mariner of the marine vessel.

22 Claims, 7 Drawing Sheets

(51) Int. Cl.
*G01S 7/51* (2006.01)
*G01S 13/91* (2006.01)
*G01S 13/937* (2020.01)
*G01S 15/93* (2020.01)
*G01S 17/93* (2020.01)
*G06F 3/04815* (2022.01)

(56) References Cited

U.S. PATENT DOCUMENTS

| | | | |
|---|---|---|---|
| 10,914,810 B2* | 2/2021 | Laster | G01S 7/6272 |
| 2007/0016372 A1* | 1/2007 | Browne | G01C 21/005 |
| | | | 701/469 |
| 2010/0238161 A1* | 9/2010 | Varga | G06T 19/006 |
| | | | 345/157 |
| 2011/0025702 A1* | 2/2011 | Lionti | G09G 3/342 |
| | | | 345/589 |
| 2011/0267184 A1* | 11/2011 | Lee | G08G 1/16 |
| | | | 348/E7.085 |
| 2013/0271309 A1* | 10/2013 | Kaida | G01S 13/937 |
| | | | 342/41 |
| 2014/0013259 A1* | 1/2014 | Thomas | G06F 3/0488 |
| | | | 715/771 |
| 2015/0127198 A1 | 5/2015 | Vartianen et al. | |
| 2016/0125739 A1 | 5/2016 | Stewart et al. | |
| 2016/0214534 A1* | 7/2016 | Richards | H04N 5/2257 |
| 2018/0107210 A1* | 4/2018 | Harnett | G05D 1/0038 |
| 2018/0232947 A1* | 8/2018 | Nehmadi | G01S 7/295 |
| 2018/0259339 A1* | 9/2018 | Johnson | G05D 1/0692 |
| 2019/0011912 A1* | 1/2019 | Lockwood | G05D 1/0027 |

OTHER PUBLICATIONS

"UBOOT—new gameplay", video published by ThePlayWay on YouTube on Sep. 1, 2016, https://www.youtube.com/watch?v=eLMQ8_BG51l (Year: 2016).*

European Patent Office, International Search Report & Written Opinion issued in corresponding Application No. PCT/EP2017/079573, mailed Aug. 6, 2018, 9 pp.

European Patent Office, International Preliminary Report on Patentabililty issued in corresponding Application No. PCT/EP2017/079573, dated Feb. 3, 2020, 16 pp.

European Patent Office, Office Action in European Patent Application No. 17804839.3, 6 pp. (Jul. 9, 2024).

* cited by examiner

REAL-TIME MONITORING OF SURROUNDINGS OF MARINE VESSEL

FIELD

The invention relates to a system for real-time monitoring of surroundings of a marine vessel, a marine vessel comprising the system, a computer-implemented method for real-time monitoring of surroundings of a marine vessel, and a computer-readable medium comprising computer program code for the one or more data processors.

BACKGROUND

Ship manoeuvring in harbour areas and other congested areas but also in the high seas is a very demanding task for the mariner. It is hard for the mariner to fully see and grasp what is happening in the surroundings of the marine vessel.

The marine radar systems typically have long range but the resolution of the information is not high enough in order to provide an accurate detection of objects, especially when the objects are close. They are not designed for accurate short range measurement. In addition, the information based on a single technology may not be enough for a reliable situation awareness.

BRIEF DESCRIPTION

The present invention seeks to provide an improved system for real-time monitoring of surroundings of a marine vessel, a marine vessel comprising the improved system, a computer-implemented method for real-time monitoring of surroundings of a marine vessel, and a computer-readable medium comprising computer program code for the one or more data processors.

According to an aspect of the present invention, there is provided a system as specified in the claims.

According to another aspect of the present invention, there is provided a method as specified in the claims.

According to another aspect of the present invention, there is provided a computer-readable medium as specified in the claims.

The invention may provide an increased safety for the ship manoeuvring as the user interface presents the marine vessel and its surroundings in an intuitive way and from a user selectable point of view.

LIST OF DRAWINGS

Example embodiments of the present invention are described below, by way of example only, with reference to the accompanying drawings, in which.

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
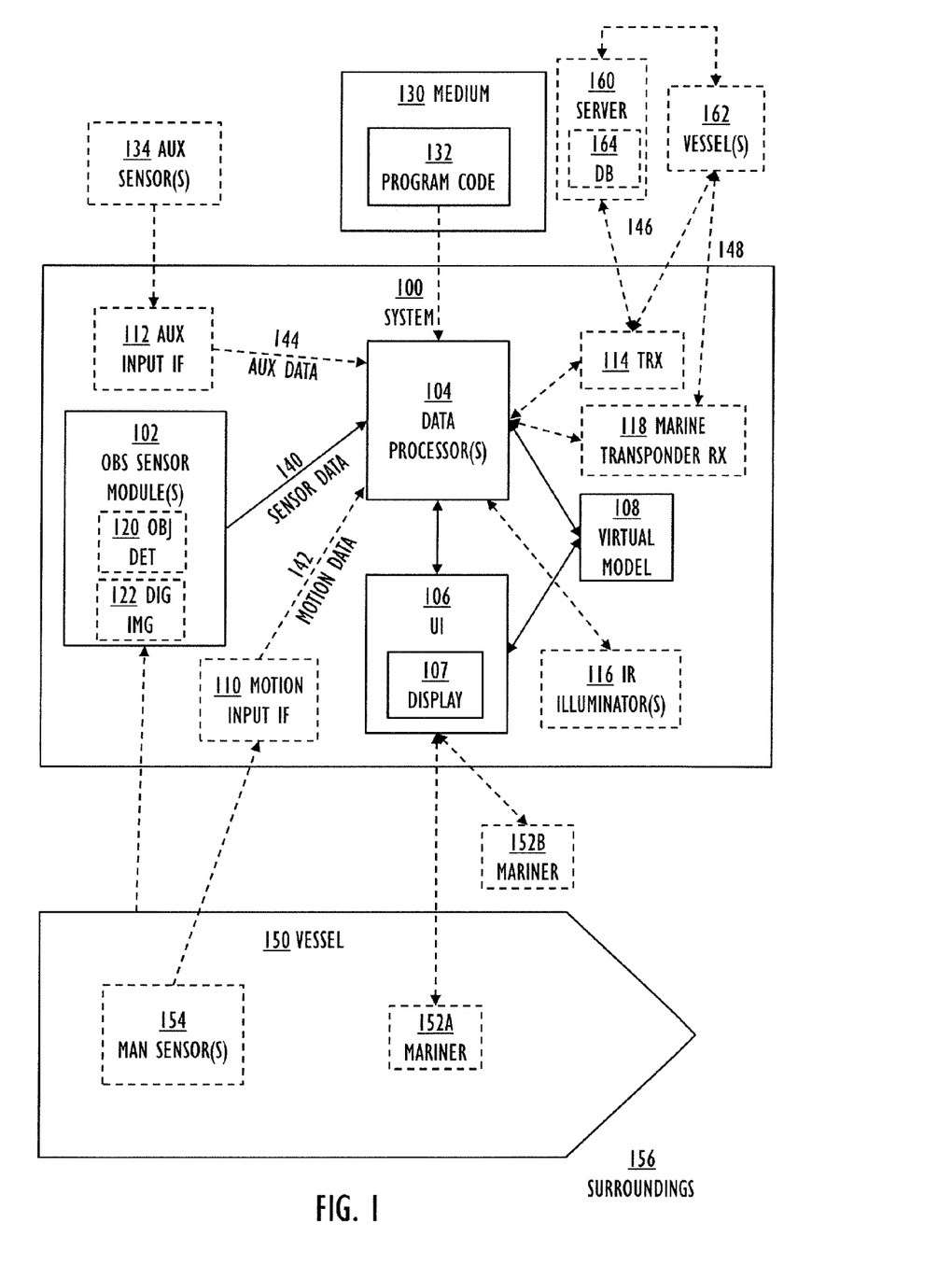
FIGS. 1, 2, 3, 4, 5 and 6 illustrate example embodiments of a system.

Let us first study FIG. 1 illustrating example embodiments of a system 100 for real-time monitoring of surroundings 156 of a marine vessel 150. Note that in this application 'real-time' refers to hard real-time or near real-time, which means that there are only the required processing and transmission delays slowing the operation.

The system 100 comprises one or more observation sensor modules 102 configured and positioned to generate sensor data 140 extending around the marine vessel 150.

In an example embodiment, the one or more observation sensor modules 102 comprise one or more object detection sensors 120 and/or one or more digital imaging sensors 122.

The object detection sensor 120 may be a radar system (in various radio frequency ranges, such as a coastal marine system, a marine radar system, a short range radar, or a long range radar, for example), a lidar system (measuring distance to an object by illuminating the object with a pulsed laser light, and measuring the reflected pulses with a sensor), a sonar system (such as a passive sonar listening for the sound made by marine vessels, or an active sonar emitting pulses of sounds and listening for echoes), an ultrasound detection system, or an acoustic detection system, for example.

The digital imaging sensor 122 may be a video camera, a near infrared camera, an infrared camera, a forward looking infrared camera, or a hyperspectral camera, for example.

Besides these sensor types, the observation sensor module 102 may include another type of a sensor capable of generating the sensor data 140 from the surroundings 156, such as a laser to measure depth of ambient water.

The system 100 comprises one or more data processors 104, communicatively coupled with the one or more observation sensor modules 102, and configured to map and visualize the sensor data 140 in relation to a virtual model 108 of the marine vessel 150.

The term 'data processor' 104 refers to a device that is capable of processing data. Depending on the processing power needed, the system 100 may comprise several data processors 104 as separate processors or as parallel processors or as a multicore processor.

The data processor 104 also utilizes memory. The term 'memory' refers to a device that is capable of storing data run-time (=working memory) or permanently (=non-volatile memory). The working memory and the non-volatile memory may be implemented by a random-access memory (RAM), dynamic RAM (DRAM), static RAM (SRAM), a flash memory, a solid state disk (SSD), PROM (programmable read-only memory), a suitable semiconductor, or any other means of implementing an electrical computer memory.

The data processor 104 and the memory may be implemented by an electronic circuitry. A non-exhaustive list of implementation techniques for the data processor 104 and the memory includes, but is not limited to: logic components, standard integrated circuits, application-specific integrated circuits (ASIC), system-on-a-chip (SoC), application-specific standard products (ASSP), microprocessors, microcontrollers, digital signal processors, special-purpose computer chips, field-programmable gate arrays (FPGA), and other suitable electronics structures.

The system comprises a user interface 106, communicatively coupled with the one or more data processors 104, and configured to display the virtual model 108 together with the visualized sensor data 140 from a user selectable point of view to a mariner 152A, 152B of the marine vessel 150.

The mariner 152A, 152B is the person who navigates the marine vessel 150 or assists as a crewmember: a captain, a navigating officer, an officer, an officer of the watch, a helmsman, or other deck crew member, or even a pilot.

The user interface 106 implements the presentation of graphical, textual and possibly also auditory information with the mariner 152A, 152B. The user interface 106 may be used to perform required user actions in relation to controlling the system 100 such as selecting the point of view. The user interface 106 may be realized with various techniques, but at least it comprises a display 107 manufactured with a suitable technology. The user interface 106 may also comprise means for producing sound, a keyboard, and/or a keypad, for example. The means for producing sound may be a loudspeaker or a simpler means for producing beeps or other sound signals. The keyboard/keypad may comprise a complete (QWERTY) keyboard, a mere numeric keypad or only a few push buttons and/or rotary buttons. In addition, or alternatively, the user interface may comprise other user interface components, for example various means for focusing a cursor (mouse, track ball, arrow keys, touch sensitive area, etc.) or elements enabling audio control.

The display 107 may be implemented with various technologies, such as:
  projected on a window (like in a head-up display, see WO 2013/174673);
  as a stationary monitor;
  as a touchscreen;
  as a part of a mobile device, such as a tablet or phablet; or
  in smartglasses (with augmented reality or virtual reality).

In an example embodiment, the virtual model 108 is a three-dimensional virtual model, and the user selectable point of view defines a selected viewing perspective of the three-dimensional virtual model 108.

The main actors are: the one or more observation sensor modules 102, the one or more data processors 104, and the user interface 106.

In an example embodiment, the one or more data processors 104 and the user interface 106 may be integrated into a single computing device: a computer, a portable computer, a laptop, a mobile phone, a smartphone, a tablet computer, smartglasses, or any other portable/stationary computing device, which may be manipulated by the mariner 152A, 152B and which has adequate processing power.

In an example embodiment, the single computing device is a general-purpose off-the-shelf computing device, as opposed to a purpose-build proprietary equipment, whereby research & development costs will be lower as only the special-purpose software (and not the hardware) needs to be designed, implemented and tested.

The communication between these actors may be implemented with appropriate wired/wireless communication technologies and standard/proprietary protocols.

In an example embodiment, the wired communication is implemented with a suitable communication technology utilizing coaxial cable, twisted pair or fibre optic such as LAN (Local Area Network) or the Ethernet.

In an example embodiment, the wireless communication is implemented with a suitable radio communication technology such as Bluetooth, Bluetooth Low Energy, Wi-Fi, WLAN (Wireless Local Area Network) or a suitable cellular communication technology such as GSM, GPRS, EGPRS, WCDMA, UMTS, 3GPP, IMT, LTE, LTE-A, etc. regardless of the generation (2G, 3G, 4G, 5G etc.).

Figure 7A:
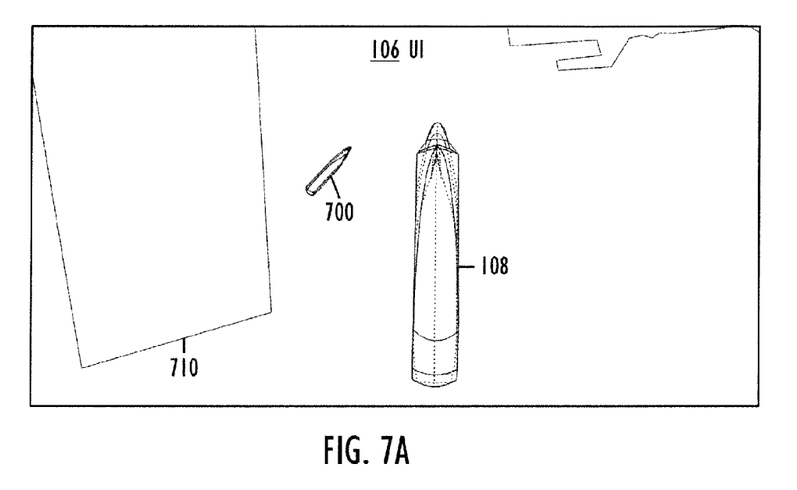
FIGS. 7A, 7B, 7C, 8, 9, 10A, 10B and 11 illustrate example embodiments of a user interface.
Figure 7B:
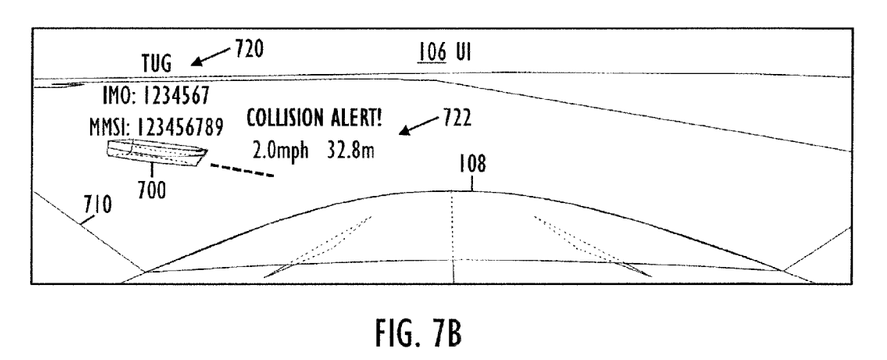
Figure 7C:
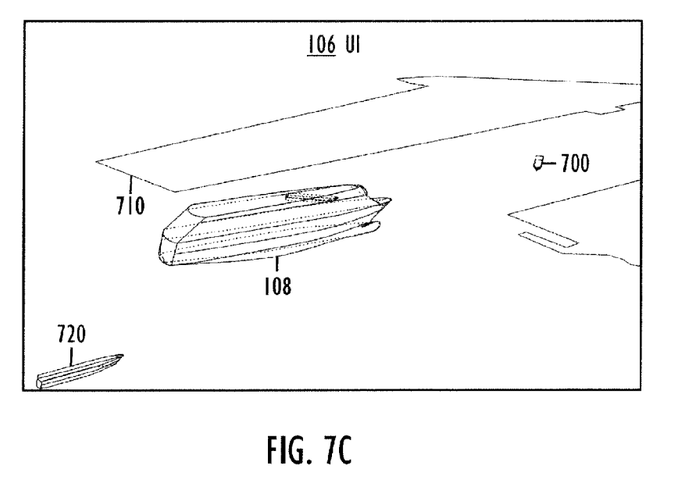

Let us study FIGS. 7A, 7B and 7C showing different point of views, or planned viewing perspectives.

In FIG. 7A, a top view is shown in the user interface 106. The virtual model 108 of the marine vessel 150 is shown. In the surroundings, another marine vessel 700 and a shoreline 710 is shown.

FIG. 7B shows a view from a bridge of the marine vessel 150 in the user interface 106.

FIG. 7C illustrates a view from rear starboard of the marine vessel 150 in the user interface 106. Besides the marine vessel 700 shown also in the top view and the bridge view, a further marine vessel 720 is now seen by the mariner 152A, 152B. This proves that the user selectable point of view increases the safety considerably as the mariner 152A, 152B may inspect the surroundings from different point of views.

Note that the views shown in the user interface 106 may be virtual, real, or part virtual and part real. For example, the surroundings 156 and the virtual model 108 may both be shown in virtual reality, on a nautical chart, for example. On the other hand, the surroundings 156 may be shown as real, filmed by a digital imaging sensor 122, but the marine vessel 150 is represented by its virtual model 108 set on the real surroundings 156. The planned point of view may be generated by a suitable graphic engine such as gaming graphic engine capable of showing the virtual model 108 on real/virtual surroundings 156.

Note also that the point of views may be predetermined or user-defined, and there may be a limited number of different views, or the user may freely define a selected point of view by selecting a viewing angle to the (possibly three-dimensional) virtual model 108.

In an example embodiment, the user interface 106 is configured to pan and zoom the user selectable point of view based on the selected viewing perspective of the three-dimensional virtual model 108.

The virtual model 108 may be visualized either in a local coordinate system of the virtual model 108, i.e., in the coordinate system of the marine vessel 150, or in a global coordinate system of the surroundings 156, i.e., in a world coordinate system such as WGS 84, EUREF 89, or a national/international nautical chart coordinate system.

Consequently, in an example embodiment, the one or more data processors 104 are configured to model and visualize the virtual model 108 in a local coordinate system of the virtual model 108, and to map and visualize the sensor data 140 in relation to the local coordinate system, and the user interface 106 is configured to display the virtual model 108 together with the visualized sensor data 140 from the user selectable point of view adjusted relative to the local coordinate system.

In an alternative example embodiment, the one or more data processors 104 are configured to model and visualize the virtual model 108 in a global coordinate system of the surroundings 156 of the marine vessel 150, and to map and visualize the sensor data 140 in relation to the global coordinate system, and the user interface 106 is configured to display the virtual model 108 together with the visualized sensor data 140 from the user selectable point of view adjusted relative to the global coordinate system.

Figure 11:
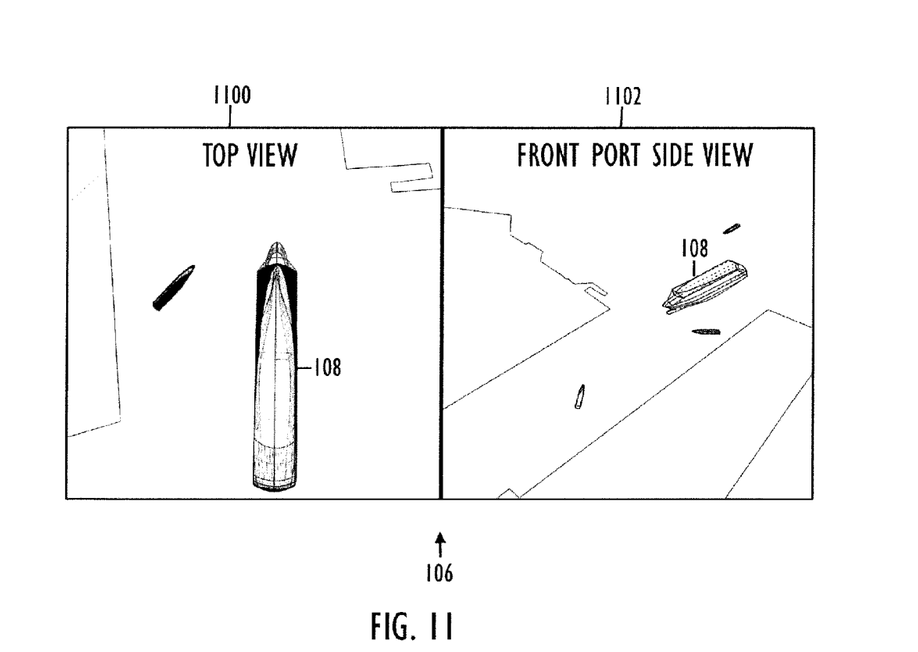

In an example embodiment illustrated in FIG. 11, the user interface 106 is configured to display the virtual model 108 together with the visualized sensor data 140 from at least two different user selectable point of views 1100, 1102 using a split-screen technique. This further enhances the safety as the mariner 152A, 152B now sees the surroundings 156 simultaneously from two different point of views, and may make well-informed decisions regarding manoeuvring, and also decide if another point of view needs to be selected and viewed in the user interface 106.

The system 100 takes advantage of the sensor technology and possibly also of computer vision to provide the mariner 152A, 152B with multiple real-time visualizations of the surroundings 156 of the marine vessel 150, which will make ship navigation and operation easier, safer and more efficient.

At the heart of the system 100 are observation sensor modules 102, which are integrated sensor units strategically located on or around the marine vessel 150, and/or installed outside of the marine vessel 150, that fuse different capabilities of e.g. lidar, radar, a high-resolution RGB digital video camera, near-infrared camera for low-light and night vision, etc.

The system 100 may also import and merge operational and voyage-specific data from other ship systems such as navigation, ship responders and weather data. By blending the input from these sensors, the system 100 may provide in an example embodiment a 360-degree horizontal field-of-view and a minimum of a few degrees of vertical elevation, envisioning the surroundings 156 of the marine vessel 150.

The system 100 combines and overlays visualizations from different sensor types in real-time, while the mariner 152A, 152B selects and manipulates the viewing angle.

The combined data of the surroundings 156 captured by the sensors 102, 134, 154 may be layered and masked in the display 107 to distinguish objects and distance from them. This helps the mariner 152A, 152B to see better in a changing and challenging environment. By bringing the sensor data into the same calibrated coordination and by layering and masking the data it is possible to create a vision capability in which the environment colours are changed and certain objects (dynamic and possibly also static) are highlighted utilizing the best performance of each separate sensor layer. During daytime, the background may be monochrome and dynamic objects are shown with RGB colours. During night-time or dusk, all wanted recognized stable objects and dynamic objects (from lidar and radar data, for example) may be highlighted with a chosen RGB colour.

The user interface 106 may enable selection of the sensor layers for use. This added with some additional information from other ship systems, maritime buoyage system, ship movement prediction, collision detection, speed, wind and other weather factors, available power from thrusters may all be layered on top of all the sensor data layers described.

By seeing the real-time operation from a perspective of someone else gives more visibility to the operation. By combining data of the surroundings 156 captured by the sensors 102, 134, 154 it is possible to create real surroundings and behaviour for a virtual 1:1 scale model of the marine vessel 150, and together with the collected data it is possible to see the operation from a third person perspective (such as a bird eye (top) or a rally game perspective (behind), and freely pan and zoom the perspective and achieve better point of view on the ship operation and situational awareness. This is shown in FIGS. 7A, 7B and 7C, and may be considered as a stand-alone example, which may be implemented independent of the other subject matter described regarding the system 100.

Figure 2:
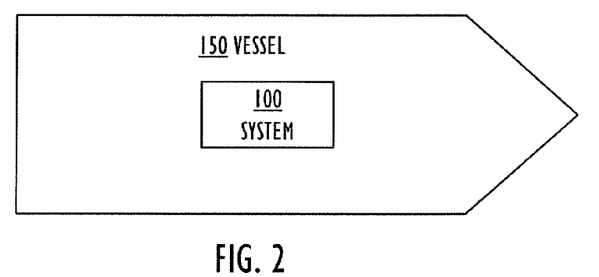
Figure 3:
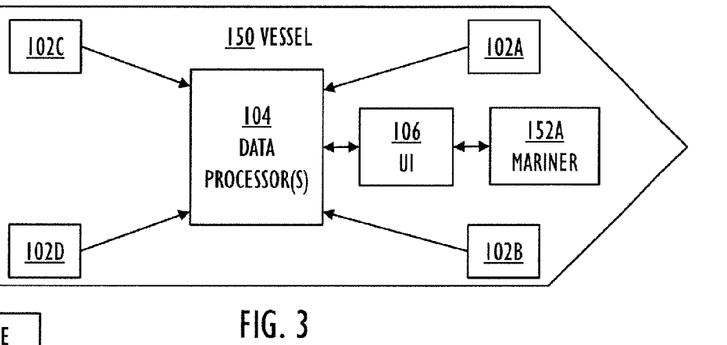

As shown in FIGS. 2 and 3, the marine vessel 150 may comprise the system 100, i.e., the system 100 is aboard the marine vessel 150.

The one or more observation sensor modules 102A, 102B, 102C, 102D may be distributed suitably around the marine vessel 150.

Note that the structures and functionalities of the one or more observation sensor modules 102 are also considered as stand-alone example embodiments, which may be implemented independent of the other subject matter described regarding the system 100.

In an example embodiment, the observation sensor module is protected by a weather-proof casing. The casing may also be shock-proof.

In an already mentioned example embodiment, the one or more observation sensor modules 102 comprise one or more object detection sensors 120 and/or one or more digital imaging sensors 122.

In an example embodiment, an inertial measurement unit (described later) is placed in the observation sensor module 102.

In an example embodiment, the one or more observation sensor modules 102 are inert. The immobility or static nature may ensure that the observation sensor modules 102 endure the hardships (such as rough sea and salt water) better.

In an example embodiment, the one or more observation sensor modules 102 may be configured and positioned so that the sensor data 140 is obtained around the marine vessel 150 with a planned horizontal field of view and with a planned vertical field of view. In an example embodiment, the planned horizontal field of view is 360 degrees. In an example embodiment, the planned vertical field of view is a few degrees (or a vertical field of view of a typical radar, such as between 3 to 10 degrees or even more). However, in some example embodiments, the planned vertical field of view may be larger, about 90 degrees, for example, when lidar and/or digital imaging sensor is used. The planned field of view may depend on the size of the marine vessel 150, the navigation circumstances and other factors affecting the visibility from the marine vessel 150. In an example embodiment, the field of view may be obtained by combining different field of views from different sensors 102. For example, a radar, lidar, and one or more digital imaging sensors may produce the composite view in the user interface 106 with a planned field of view, both in horizontal and vertical directions. In an example embodiment, the field of views of different sensors may be overlapping, partly overlapping, or next to each other.

In an example embodiment, the one or more observation sensor modules 102 may achieve the horizontal field of view and the vertical field of view with lacking mechanical or optical pan, tilt or zoom adjustment. Again, this feature may improve the life-time expectancy of the observation sensor modules 102.

The one or more observation sensor modules 102 may be configured to communicate with the one or more data processors 104 using a wireless communication technology.

The one or more observation sensor modules 102 may be configured to be powered by a battery or a local power input cable. The one or more observation sensor modules 102 may be configured to be powered by a power over Ethernet technology.

In FIG. 2, the one or more observation sensor modules 102 are configured and positioned so that they are aboard the marine vessel 150.

Figure 4:
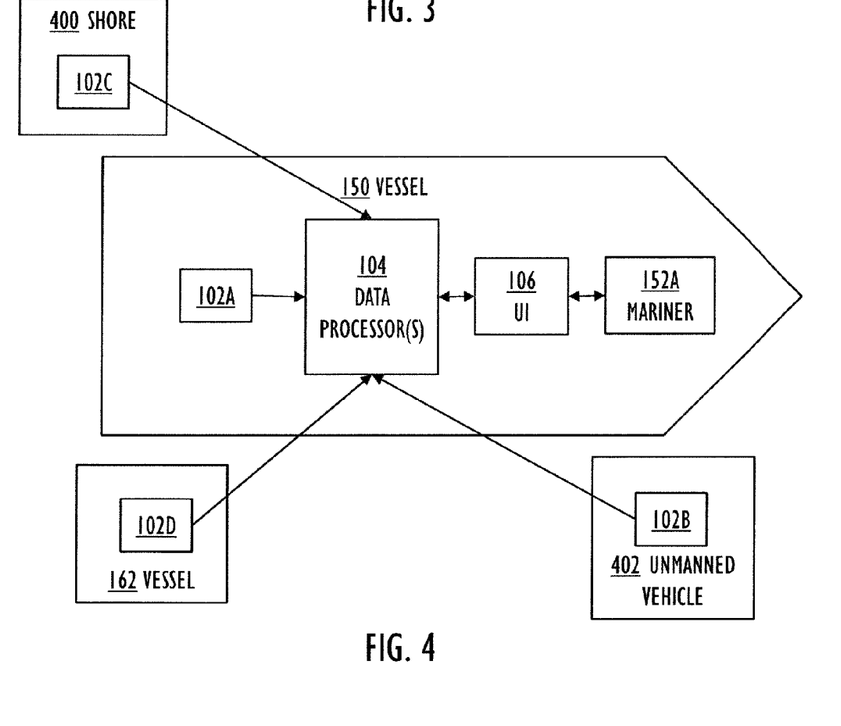

In an alternative example embodiment of FIG. 4, the one or more observation sensor modules 102 are configured and positioned so that they are placed outside of the marine vessel 150. FIG. 4 illustrates some implementations of this feature: the observation sensor module 102C may be placed ashore (in a suitable support structure coupled with land or a wharf, for example), the observation sensor module 102D may be aboard another marine vessel 162, or the observation sensor module 102B may be place in an unmanned (aerial or naval) vehicle 402.

FIG. 4 also illustrates that, besides being placed outside of the marine vessel 150, one or more observation sensor modules 102A may be placed in the marine vessel 150 as well.

Figure 5:
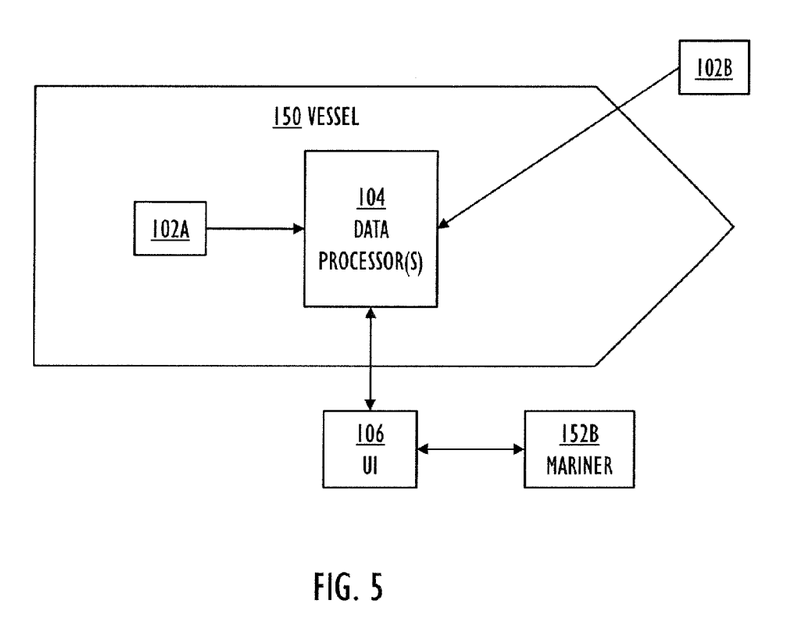

FIGS. 3 and 4 illustrate also that the mariner 152A is aboard the marine vessel 150. However, as shown in FIGS. 1 and 5, the mariner 152B may be outside of the marine vessel 150, whereby the mariner 152B is able to remote control the marine vessel 150 (which may then an unmanned or autonomous ship) or at least additionally monitor (as a pilot guiding ships through hazardous waters but residing in a piloting station or another remote-control station, for example, and maybe also control) the marine vessel 150 in addition to or instead of the mariner 152A aboard. The pilot 152B may thus better give guidance to the mariner 152A on board.

Figure 6:
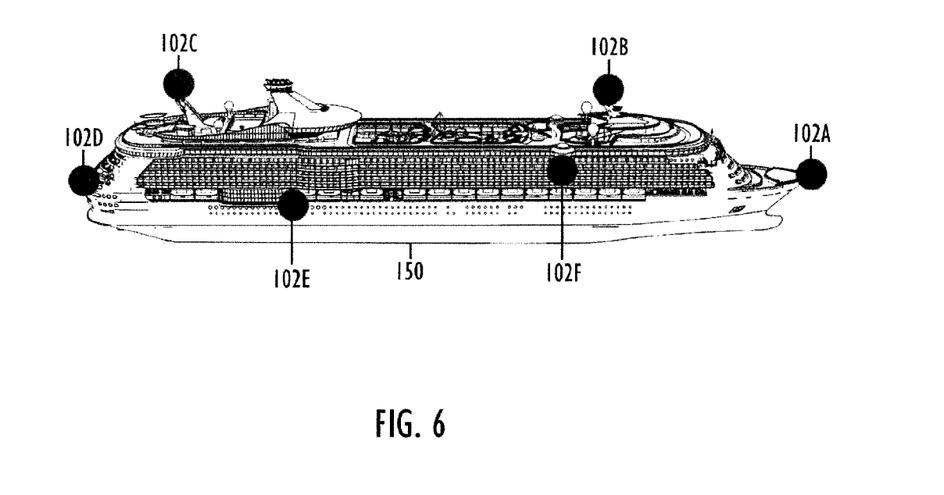

FIG. 6 illustrates further the placement of the observation sensor modules 102 in the marine vessel 150: the observation sensor module 102A is in the bow, the observation sensor modules 102B, 102C are in elevated structures such as in the mast, the observation sensor module 102D is in the stern, and the observation sensor modules 102E, 102F are in the broadside (as shown in the starboard side, but also in the port side).

Besides the observation sensor modules 102, the system 100 may comprise other sensors and/or sensor interfaces to obtain further data to display in the user interface 106.

Figure 8:
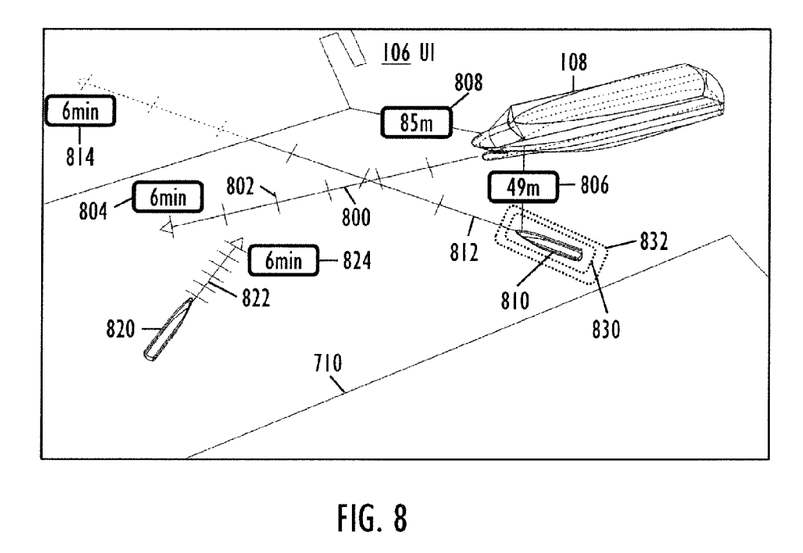

As shown in FIG. 1, the system 100 may comprise a motion input interface 110 configured to obtain motion data 142 from one or more manoeuvre sensors 154 of the marine vessel 150. The one or more data processors 104 are communicatively coupled with the motion input interface 110, and configured to model and visualize a movement of the virtual model 108 based on the motion data 142. The user interface 106 is configured to display the virtual model 108 together with the visualized movement from the user selectable point of view. This feature is shown in FIG. 8: the virtual model 108 is shown with the movement line 800 illustrating course. The speed may also be shown: the line 800 has six cross-lines 802, each illustrating the distance travelled in one minute, and a label 804 may be shown illustrating the future location of the marine vessel 150 in six minutes.

In an example embodiment, the one or more data processors 104 are configured to predict future states of the marine vessel 150 based on a mathematical model of the marine vessel 150 and current states. The current/future states may comprise a motion state, a rudder state and/or a propulsion system state of the marine vessel 150, etc. The user interface 106 is configured to show the predicted future states. Also, future states of other marine vessels 162 may be predicted and shown. The predictions may utilize internal control data of the marine vessel 150 (from its various system, such as engine and rudder control systems), and also other data 140, 142, 144, 146, 148 obtained with various sensors 102, 134, 154, and from other marine vessels 162 and/or the server 160.

The manoeuvre sensor 154 may be an inertial measurement unit (IMU, using a combination of accelerometers and gyroscopes, sometimes also magnetometers) of the marine vessel 150, a global navigation satellite system (GNSS) receiver of the marine vessel 150, a gyrocompass of the marine vessel 150, an inclinometer (measuring angles of slope, or tilt) of the marine vessel 150, or a control system controlling the one or more apparatuses exerting force from the marine vessel 150 to the ambient water.

The apparatus exerting force may be an electric motor driving a propeller and interacting with a rudder, a stern thruster, a tunnel (or bow) thruster 422, an electric podded azimuth thruster (such as Azipod®), etc.

FIG. 1 also shows that the system 100 may comprise an auxiliary input interface 112 configured to obtain auxiliary data 144 from one or more auxiliary sensors 134. The one or more data processors 104 are communicatively coupled with the auxiliary input interface 112, and configured to map and visualize the auxiliary data 144 in relation to the virtual model 108. The user interface 106 is configured to display the virtual model 108 together with the visualized auxiliary data 144 from the user selectable point of view.

The auxiliary sensor 134 may be an electronic navigational chart system of the marine vessel 150, a marine transponder transceiver 118 of the marine vessel 150, a weather data system of the marine vessel 150, or a maritime buoyage system in the surroundings 156.

The marine transponder receiver 118 may operate according to AIS (Automatic Identification System), for example. FIG. 7B illustrates that the auxiliary data 144, 720, is shown in the user interface 106: type of ship is "TUG", IMO (International Maritime Organization) number is "1234567", and MMSI (Maritime Mobile Service Identity) is "123456789". FIG. 7B also illustrates that a "COLLISION ALERT" 722 is raised based on comparing own position of the marine vessel 108 with the position, course and speed obtained from the AIS transponder of the tug 700. Further auxiliary data 144 is given in the user interface 106: the tug 700 is 32.8 meters away, its speed is 2 mph, and it is in a collision course with the marine vessel 108.

In an example embodiment illustrated in FIG. 1, the system 100 comprises a radio transceiver 162 configured to exchange sensor data 146 with a network server 160 communicating with a plurality of other marine vessels 162, and/or directly with another marine vessel 162.

The network server 160 may be implemented with any applicable technology. It may include one or more centralized computing apparatuses, or it may include more than one distributed computing apparatuses. It may be implemented with client-server technology, or in a cloud computing environment, or with another technology capable of communicating with the system 100.

Figure 10A:
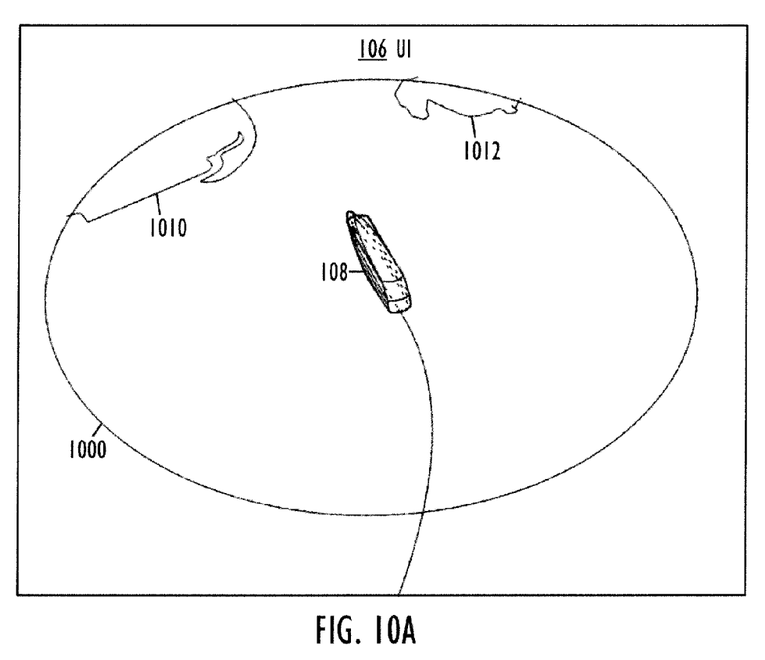

FIG. 10A illustrates a situation where the marine vessel 100 has to rely on its own sensor data 140, possibly augmented by the motion data 142 and the auxiliary data 112. Within a range 1000 of the system 100 some shorelines 1010, 1012 are shown.

Figure 10B:
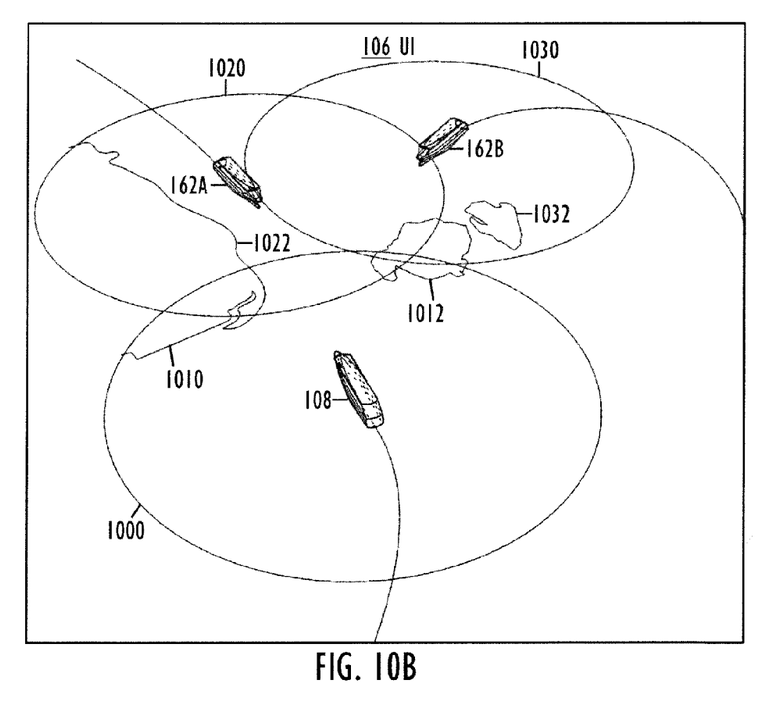

In FIG. 10B, the radio transceiver 162 is configured to obtain external sensor data generated by another marine vessel 162A, 162B, the one or more data processors 104 are configured to map and visualize the external sensor data in relation to the virtual model. Therefore, the ranges 1000, 1020, 1030 of the systems 100 of the three marine vessels 150, 162A, 162B may be combined, and the user interface 106 is configured to display the virtual model 108 together with the visualized external sensor data 146 from the user selectable point of view: besides the shorelines 1010, 1012, additional shorelines 1022, 1032, and also the other marine vessels 162A, 162B may be shown for the mariner 152A, 152B. Such cooperation may also aid the mariners of the other marine vessels 162A, 162B, and they may see the same information as the mariner 152A, 152B, but from a different direction, of course.

The feature of FIG. 10B may be implemented in real-time or non-real-time: the external sensor data 146 may originate from the marine vessel 162A/162B that is or has earlier been in or near a current location of the marine vessel 150.

FIGS. 1 and 10B also illustrate two stand-alone example embodiments, which may be implemented independent of the other subject matter described regarding the system 100. With the described cooperation, the limited sensing range 1000 of the marine vessel 108 as shown in FIG. 10A is widened as shown FIG. 10B with the combined sensing ranges 1000, 1020, 1030.

Normally operators rely on weather forecasts from weather forecast providers and automatic identification data from AIS. Such data may be outdated as it is far from being real-time data. The locally generated sensor data of the marine vessel 150 may be shared with other marine vessels 162 directly and/or through the network server 160. This communication may be implemented with a suitable radio transceiver, such as with a marine transponder system, or with ABB® VISION system. With utilization of data sensors and dynamic, static and voyage-specific data it is possible to get real-time data and share it with other operators instead of relaying only on forecasts. Sensor vision of the surroundings 156 of the marine vessel 150 is combined with data from other vessels: such as AIS (dynamic, static and voyage-specific data), weather, last routes, etc.

1. The system 100 collects and processes the data transmitted via sensors and ship identification systems such as AIS (Automatic Identification System) and weather forecast providers.
2. All marine vessels 150, 162 equipped with similar sensors and transponders may emit data which may be received by any data receiving unit.
3. Antennas and sensors pick up data, send it to a transceiver station, the transceiver station sends it to the server 160, and the server 160 to a central database 164, where it is stored and processed with further information from various receiving stations.
4. The central database 164 comprises data and shares it with a MarineTraffic database or the like.
5. The combined data is utilized in vessel operation. AIS-type and real-time data from these sensors 102, 134, 154 complement each other for a better situational awareness and route planning.

The marine vessel 150, 162 may independently utilize the data it captures with the sensors, but the same data may be utilized by other seafarers as well. It is also possible to utilize the system 100 on static shore installations or the like so that smaller vessels may use the data when approaching or navigating in the area captured by sensors.

The marine vessel 162 may even only utilize the data captured by other marine vessels 150, i.e., the marine vessel does not necessarily need any sensors of the system 100, but only the user interface 106 and the receiver 114 (and possibly also one or more data processors 104 for local data manipulation). In this way, the marine vessel 162 benefits greatly from the cooperation. The data received by the marine vessel 162 may be in real-time and/or the data may be historical data collected by the other marine vessel 150. For example, the marine vessel 162 may be a tug (or even many tugs) towing the marine vessel 162, whereby the tug personnel is able to see what the mariner 152A of the marine vessel 150 sees, each in their own user interface 106. The tug personnel may see the predicted movement of the towed marine vessel 150, which may greatly help in the operation and also increase the safety. In the second stand-alone example embodiment, in short- and long-range radars, real-time radio waves bounce off objects, and with them speed and distance may be calculated. Lidar's real-time light pulses reflect off objects and objects may be distinguished. These technologies are limited by the fact that they only see the reflection of surfaces that are perpendicular to the sensors and other obstacles behind that visible view are hiding. Hence, the data gathered by the combined sensor technologies improve the situational awareness of the marine vessel 150. This data combined with the data captured by the other marine vessels 162 may create a wider and better situational awareness. For example, the marine vessel 150 asks data from the server 160 based on its current position and requested range, and the server 160 sends the data to the marine vessel 150.

Figure 9:
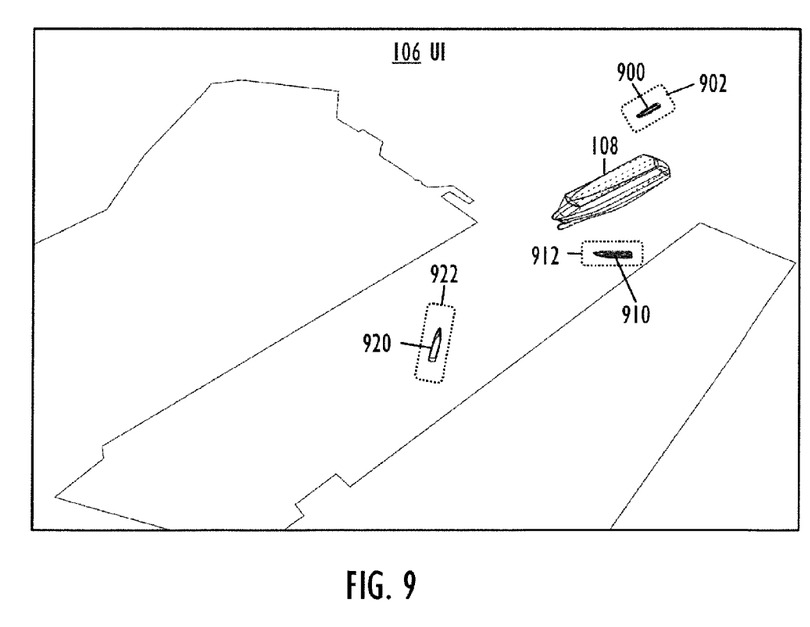

In an example embodiment shown in FIG. 9, the one or more data processors 104 are configured to detect one or more objects 910, 920 in the surroundings 156 of the marine vessel 150 based on analyzing the sensor data 140, map and visualize the detected one or more objects in relation to the virtual model 108. The user interface 106 is configured to display the virtual model 108 together with the one or more objects 910, 920 from the user selectable point of view.

In an example embodiment, the detected objects 910, 920 may be visualized by displaying an image of the object 910, 920. The image may be generated based on a virtual model (two- or three-dimensional) of the object 910, 920, based on an image (or outline) obtained with the one or more observation sensor modules 102 (such as object detection sensors 120, and/or digital imaging sensors 122), or by an image obtained from the database 164 based on identification data (such as MMSI or IMO number) of the object 910, 920 (obtained with the marine transponder receiver 118, for example from the AIS). The object detection sensors 120 may generate an outline of the object 910, 920, or the digital imaging sensor 122 may generate an image of the object 910, 920, for example.

In an example embodiment, the virtual model of the object 910, 920 may be generated by scaling from a general model (a database 164 may comprise a plurality of different models, for each type of ship, for example). The model may also be rotated to a correct position in relation to the point of view.

In an example embodiment, the one or more data processors 104 are configured to detect the one or more objects 910, 920 by analyzing the sensor data 140 with radar analysis techniques and/or lidar analysis techniques and/or sonar analysis techniques.

In an example embodiment, the one or more data processors 104 are configured to detect the one or more objects 910,920 by analyzing the sensor data 140 with machine vision or computer vision techniques, such as object recognition and tracking techniques. The machine or computer vision system may be configured to detect typical objects present in the sea and harbour: various ship types, watercraft, cranes, wharf structures, etc.

As shown in FIG. 1, the system 100 may comprise one or more infrared illuminators 118 configured and positioned to illuminate a field of view of a near infrared camera or an infrared camera when the surroundings 156 of the marine vessel 150 are in dusk or dark. This may ease the detection of the object 910, 920 in dusk or dark.

In an example embodiment, the one or more data processors 104 are configured to label a unique identifier for the detected object 910, 920 based on auxiliary data 148 received with a marine transponder transceiver 118 of the marine vessel 150. The user interface 106 is configured to display the unique identifier for the detected object 910, 920.

In an example embodiment of FIG. 8, the one or more data processors 104 are configured to obtain course and speed data for the detected object 810, 820 based on the auxiliary data 148 received with the marine transponder transceiver 118. The user interface 106 is configured to display the course and speed 812, 814, 822, 824 for the detected object 810, 820.

In an example embodiment, the one or more data processors 104 are configured to obtain image data for the detected object 910, 920 from a database 164 based on the unique identifier of the detected object 910, 920. The user interface 106 is configured to display an image of the detected object 910, 920 based on the image data.

In an example embodiment, the one or more data processors 104 are configured to determine a visibility in the surroundings 156 of the marine vessel 150 with a scale of at least two values, a good visibility and a poor visibility. The user interface 106 is configured to display the detected objects 910, 920 with a safety colour 912, 922 that stands out among a background.

In an example embodiment, the user interface 106 is configured to display the background in monochrome.

In an example embodiment of FIG. 9, the user interface 106 is configured to display the detected object 910, 920 that is dynamic or static with the safety colour 912, 922 if the visibility has the value poor visibility. FIG. 9 illustrates this feature if we suppose that both objects 910 and 920 are either dynamic or static and the visibility is poor.

In an example embodiment of FIG. 9, the user interface 106 is configured to display only the detected object 920 that is dynamic with the safety colour 922 if the visibility has the value good visibility. FIG. 9 illustrates this feature if we suppose that the object 920 is dynamic, the object 910 is static, and the visibility is good.

In an example embodiment of FIG. 8, the one or more data processors 104 are configured to estimate a possible danger of collision of the detected object 810, 820 with the marine vessel 150. The user interface 106 is configured to display the detected object 810 with the danger of collision with a safety colour 830. The collision estimation may be made as follows, for example:

- objects 810, 820 are classified using clustering, classification methods, machine vision techniques, or computer vision techniques (or the information is obtained from a marine transponder system such as AIS);
- objects 810, 820 are tracked using a tracking algorithm including but not limited to kernel-based tracking, contour tracking, Kalman filter, particle filter, or Bayesian filter;
- the speed and course of all objects 810, 820 are calculated based on previous positions of the objects (or obtained from AIS), this may also be performed by the tracking algorithm directly;
- the closest point of approach (CPA) as well as time to closest point of approach (TCPA) are calculated for all objects 810, 820; and
- the objects coming closer than a certain CPA value below certain time (TCPA) are highlighted.

FIG. 8 also illustrates that the one or more data processors 104 may be configured to recognize the detected object 810 coming from a direction for which the marine vessel 150 is responsible (according to COLREGS, for example) to make a collision avoidance manoeuvre. The user interface 106 is configured to display the detected object 810 for which the marine vessel 150 is responsible to make the collision avoidance manoeuvre with an enhanced safety colour 832.

In an example embodiment, the one or more data processors 104 are configured to estimate whether the marine vessel 150/810 responsible to make the collision avoidance manoeuvre will succeed in it, and, if the estimation shows that the collision is likely, the user interface 106 is configured to issue a collision alert. Note that this example embodiment may apply to the marine vessel 150, and/or to the other marine vessel 810/162 (=the detected object).

The one or more data processors 104 may also be configured to take into account the physical properties of the detected object 810 according to the transponder data or classification results using machine vision or computer vision techniques and estimate the capability of the object 810 to change its course and speed. If the detected object 810 is, for example, a large oil tanker, it cannot change course or speed very fast. Therefore, the mariner 152A, 152B may be alerted that a vessel, which is responsible to make a collision avoidance manoeuvre, cannot possibly make such manoeuvre in time to prevent collision due to physical size or decreased manoeuvring capability information obtained from the transponder system. The physical properties may be based on data obtained from public or commercial databases (such as 164) based on the vessel identification number. These properties may include the mass, draught, speed, propulsion power, length, width, and other relevant information. The properties may be used to generate a mathematical model of the vessel 810, which may be used to calculate the capability region for the vessel 810, meaning the maximum change in course and speed physically possible for the detected object 810. The capability region of the detected object 810 may be illustrated for the user 152A, 152B in the user interface 106 and highlighted in order to give the information that the detected object 810 is not capable of following the COLREGS and requires therefore special attention. Note that this example embodiment may apply to the marine vessel 150 (meaning that its capabilities, motion state and other above mentioned factors are taken into account in deciding whether itself is able to avoid the collision with the detected object), and/or to the other marine vessel 810/162 (=the detected object) as described above. The system 100 may also be capable of transmitting a collision alert to the other marine vessel 810, with the transceiver 114, or with the marine transponder system (AIS, for example) transmitter, for example.

Figure 12:
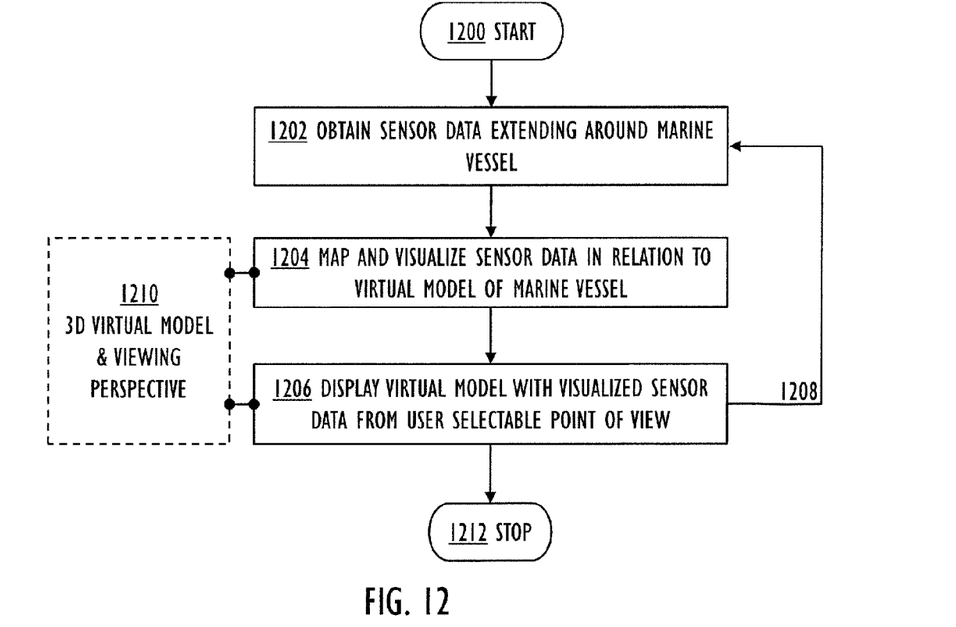
FIG. 12 is a flow-chart illustrating example embodiments of a method.

FIG. 12 is a flow-chart illustrating example embodiments of a computer-implemented 104 method for real-time monitoring of the surroundings 156 of the marine vessel 150.

The operations are not necessarily in a chronological order, and some of the operations may be performed simultaneously or in an order differing from the given ones. Other functions may also be executed between the operations or within the operations and other data exchanged between the operations. Some of the operations or part of the operations may also be left out or replaced by a corresponding operation or a part of the operation. It should be noted that no special order of operations is required, except where necessary due to the logical requirements for the processing order.

The method starts in 1200.

In 1202, sensor data extending around the marine vessel is obtained with one or more observation sensor modules.

In 1204, the sensor data is mapped and visualized in relation to a virtual model of the marine vessel.

In 1206, the virtual model is displayed together with the visualized sensor data from a user selectable point of view to a mariner of the marine vessel.

The method ends in 1212, or it may be looped 1208 back from operation 1206 to operation 1202 in order to keep on monitoring the surroundings in real-time.

In an example embodiment 1210, the virtual model is a three-dimensional virtual model, and the user selectable point of view defines a planned viewing perspective of the three-dimensional virtual model.

The method may be implemented by the earlier described system 100. The described example embodiments of the system 100 may be utilized to enhance the method as well.

An example embodiment illustrated in FIG. 1 provides a computer-readable medium 130 comprising computer program code 132 for the one or more data processors 104, which, when loaded into the one or more data processors 104 and executed by the data processors 104, causes the one or more data processors 104 to perform the computer-implemented method of FIG. 12 for real-time monitoring of the surroundings 156 of the marine vessel 150.

The computer program code 132 may be implemented by software. In an example embodiment, the software may be written by a suitable programming language (a high-level programming language, such as C, C++, or Java, or a low-level programming language, such as a machine language, or an assembler, for example), and the resulting executable code 132 may be stored on the memory and run by the data processor 104.

In an example embodiment, the operations of the computer program code 132 may be divided into functional modules, sub-routines, methods, classes, objects, applets, macros, etc., depending on the software design methodology and the programming language used. In modern programming environments, there are software libraries, i.e. compilations of ready-made functions, which may be utilized by the computer program code 132 for performing a wide variety of standard operations. In an example embodiment, the computer program code 132 may be in source code form, object code form, executable file, or in some intermediate form.

The computer-readable medium 130 may comprise at least the following: any entity or device capable of carrying the computer program code 132 to the data processor 104, a record medium, a computer memory, a read-only memory, an electrical carrier signal, a telecommunications signal, and a software distribution medium. In some jurisdictions, depending on the legislation and the patent practice, the computer-readable medium 130 may not be the telecommunications signal. In an example embodiment, the computer-readable medium 130 may be a computer-readable storage medium. In an example embodiment, the computer-readable medium 130 may be a non-transitory computer-readable storage medium.

It will be obvious to a person skilled in the art that, as technology advances, the inventive concept can be implemented in various ways. The invention and its embodiments are not limited to the example embodiments described above but may vary within the scope of the claims.

The invention claimed is:

1. A system for real-time monitoring of surroundings of a marine vessel, comprising:
   one or more digital sensors and one or more object detection sensors of one or more observation sensors sensor modules configured and positioned to generate sensor data extending around the marine vessel, wherein the object detection sensors comprise one or more of a radar system, a lidar system, a sonar system, an ultrasound detection system, or an acoustic system;
   one or more data processors, communicatively coupled with the one or more observation sensors sensor modules, wherein the one or more data processors are configured to:
   detect one or more objects in the surroundings of the marine vessel based on analyzing the sensor data, combine data from different sensors, and
   map and visualize the detected one or more objects in relation to a virtual model of the marine vessel that is in scale and perspective of a view in real time, wherein the scale of the virtual model is a 1:1 scale, while receiving selection and viewing angle data input through a user interface from a mariner;
   a transceiver, communicatively coupled with the one or more data processors, and configured to transmit the analyzed sensor data to a second marine vessel; and
   the user interface, communicatively coupled with the one or more data processors, and configured to display the virtual model together with the visualized sensor data, and the detected one or more objects from at least two user selectable point of views to a mariner of the marine vessel using a split-screen technique.

2. The system of claim 1, wherein the virtual model is a three-dimensional virtual model, and the at least two user selectable point of views define view defines a selected viewing perspectives perspective of the three-dimensional virtual model.

3. The system of claim 1, wherein the external sensor data originates from the marine vessel that is or has earlier been in or near a current location of the marine vessel.

4. The system of claim 1, wherein the one or more data processors are configured to detect the one or more objects by analyzing the sensor data with machine vision or computer vision techniques.

5. The system of claim 1, wherein the system comprises one or more infrared illuminators configured and positioned to illuminate a field of view of a near infrared camera or an infrared camera when the surroundings of the marine vessel are in dusk or dark.

6. The system of claim 1, wherein:
   the one or more data processors are configured to label a unique identifier for the detected object based on auxiliary data received with a marine transponder transceiver of the marine vessel; and
   the user interface is configured to display the unique identifier for the detected object.

7. The system of claim 6, wherein:
   the one or more data processors are configured to obtain image data for the detected object from a database based on the unique identifier of the detected object; and
   the user interface is configured to display an image of the detected object based on the image data.

8. The system of claim 1, wherein:
   the one or more data processors are configured to determine a visibility in the surroundings of the marine vessel with a scale of at least a first predetermined visibility value and a second predetermined visibility value; and
   the user interface is configured to display the detected objects with a safety colour that stands out among the background.

9. The system of claim 8, wherein the user interface is configured to display the detected object that is dynamic or static with the safety colour if the visibility has a value of poor visibility.

10. The system of claim 8, wherein the user interface is configured to display only the detected object that is dynamic with the safety colour if the visibility has the first predetermined visibility value.

11. The system of claim 1, wherein:
the one or more data processors are configured to estimate a possible danger of collision of the detected object with the marine vessel; and
the user interface is configured to display the detected object with the danger of collision with a safety colour.

12. The system of claim 11, wherein:
the one or more data processors are configured to recognize the detected object coming from a direction for which the marine vessel is responsible to make a collision avoidance manoeuvre; and
the user interface is configured to display the detected object for which the marine vessel is responsible to make the collision avoidance manoeuvre with an enhanced safety colour.

13. The system of claim 11, wherein the one or more data processors are configured to estimate whether the marine vessel responsible to make a collision avoidance manoeuvre will succeed in it, and, if the estimation shows that the collision is likely, the user interface is configured to issue a collision alert.

14. The system of claim 1, wherein the one or more observation sensors are configured and positioned so that the sensor data is obtained around the marine vessel with a planned horizontal field of view and with a planned vertical field of view.

15. The system of claim 14, wherein the one or more observation sensors achieve the horizontal field of view and the vertical field of view with lacking mechanical or optical pan, tilt or zoom adjustment.

16. The system of claim 1, wherein the one or more observation sensors are positioned outside of the marine vessel in a suitable structure coupled with land, aboard another marine vessel, or in an unmanned vehicle.

17. The system of claim 1, wherein the user interface is configured to display the virtual model together with the visualized sensor data and the detected one or more objects from the at least two user selectable point of views simultaneously to the mariner.

18. The system of claim 1, wherein the one or more data processors are configured to display an indication corresponding to the marine vessel within the virtual model of the marine vessel.

19. The system of claim 1, wherein the virtual model of the marine vessel is based on an image or outline of the marine vessel obtained from the one or more observation sensor modules.

20. The system of claim 1, wherein the object detection sensors generate an outline of the marine vessel.

21. A computer-implemented method for real-time monitoring of surroundings of a marine vessel, comprising:
obtaining sensor data extending around the marine vessel from one or more digital sensors and one or more object detection sensors of one or more observation sensors, wherein the object detection sensors comprise one or more of a radar system, a lidar system, a sonar system, an ultrasound detection system, or an acoustic system;
detecting one or more objects in the surroundings of the marine vessel based on analyzing the sensor data,
combining data from different sensors, and
mapping and visualizing the detected one or more objects in relation to a virtual model of the marine vessel that is in scale and perspective of a view in real time, wherein the scale of the virtual model is a 1:1 scale, while receiving selection and viewing angle data input through a user interface from a mariner;
transmitting the analyzed sensor data to a second marine vessel;
displaying the virtual model, together with the visualized sensor data, and the detected one or more objects, from at least two user selectable point of views to the mariner of the marine vessel using a split-screen technique.

22. A non-transitory computer-readable medium comprising computer program code, which, when loaded into one or more data processors and executed by the one or more data processors, causes the one or more data processors to perform computer implemented real-time monitoring of surroundings of a marine vessel comprising:
obtain sensor data extending around the marine vessel from one or more digital sensors and one or more object detection sensors of one or more observation sensors, wherein the object detection sensors comprises one or more of a radar system, a lidar system, a sonar system, an ultrasound detection system, or an acoustic system;
detecting one or more objects in the surroundings of the marine vessel based on analyzing the sensor data,
combining data from different sensors, and
mapping and visualizing the detected one or more objects in relation to a virtual model of the marine vessel that is in scale and perspective of a view in real time, wherein the scale of the virtual model is a 1:1 scale, while receiving selection and viewing angle data input through a user interface from a mariner;
transmitting the analyzed sensor data to a second marine vessel;
display the virtual model, together with the visualized sensor data, and the detected one or more objects, from at least two user selectable point of views to the mariner of the marine vessel using a split-screen technique.

* * * * *